United States Patent [19]

Tash

[11] Patent Number: 4,790,356
[45] Date of Patent: Dec. 13, 1988

[54] DRAIN PIPE PLUG DEVICE

[76] Inventor: George Tash, 18658 Chase St., Northridge, Calif. 91324

[21] Appl. No.: 123,875

[22] Filed: Nov. 23, 1987

[51] Int. Cl.$^4$ .................... G01M 03/02; B08B 09/02
[52] U.S. Cl. .................................... 138/93; 138/177; 138/90; 134/167 C; 4/256
[58] Field of Search ............... 138/89, 90, 93, 118, 138/177, 178, DIG. 11; 134/166 C, 167 C; 4/256; 15/104.3 R

[56] References Cited

U.S. PATENT DOCUMENTS

| | | | |
|---|---|---|---|
| 1,506,418 | 8/1924 | Evensta et al. | 138/93 X |
| 2,171,023 | 8/1939 | Buxton | 138/118 X |
| 3,431,945 | 3/1969 | Robillard | 138/90 |
| 3,802,449 | 4/1974 | Mulinex | 134/166 C |
| 4,283,447 | 8/1981 | Flynn | 138/177 X |
| 4,460,019 | 7/1984 | Condon | 138/90 |
| 4,660,603 | 4/1987 | Tash | 138/93 X |

FOREIGN PATENT DOCUMENTS 1511812  5/1978  United Kingdom ................ 138/95

Primary Examiner—James E. Bryant, III
Attorney, Agent, or Firm—John J. Posta, Jr.

[57] ABSTRACT

The drain pipe plug device for drain testing includes an elongated elastomeric, flexible, resilient, hollow, generally cylindrical tube which has a central passageway running its length and in communication with a rear portion bearing an inlet and front portion bearing an outlet. These two portions are joined to a middle portion of the same external diameter as the front and rear portions. The inlet is fitted with a connector adapted to receive water and air hoses. The outlet is fitted with a pressure relief valve. The sidewall thickness of the device uniformly tapers down from the front portion through the middle and rear portions. The front tube portion collapses first after the device has been radially expanded under fluid pressure, so as to prevent backflow of fluid through the device. The front and rear ends of the device are tapered down externally to facilitate sliding the device through drain pipes. The front and rear portions bear external spaced transverse ribs while the middle portion has an external grid pattern of spaced longitudinal and transverse ribs. In one embodiment, the longitudinal ribs extend through the front and rear portions but are slightly lower in height than said transverse ribs to facilitate flexing and sliding of the latter for improved sealing.

22 Claims, 1 Drawing Sheet

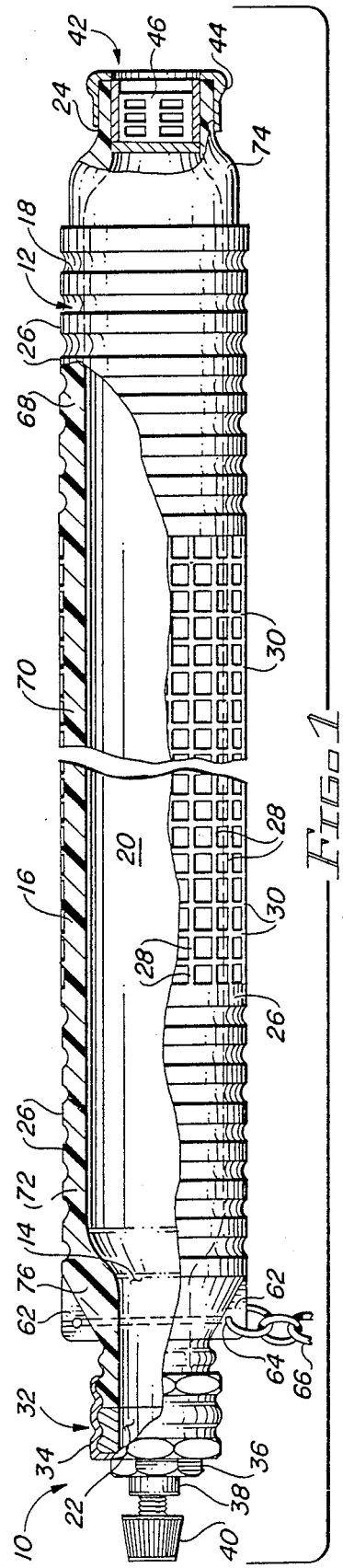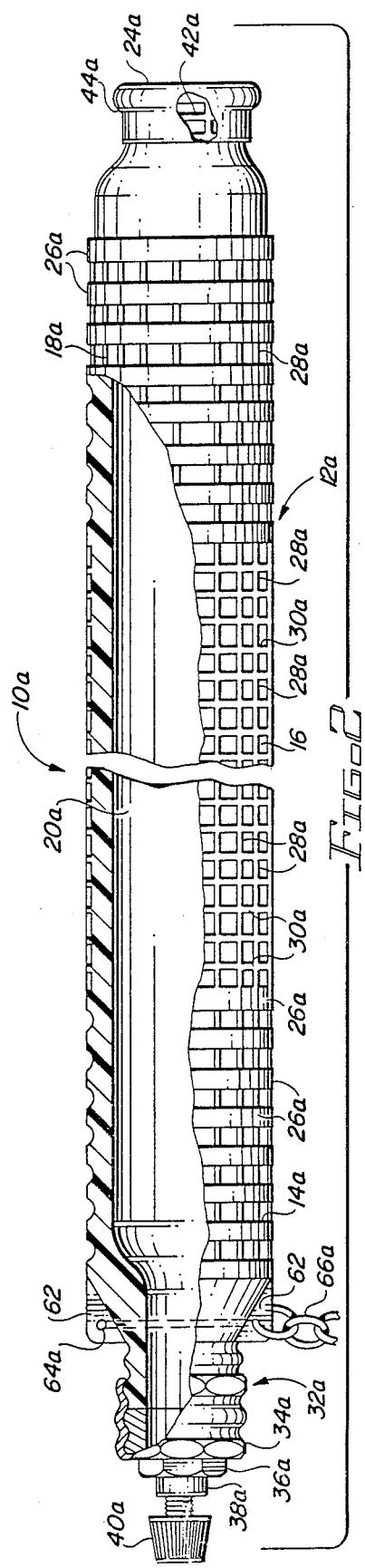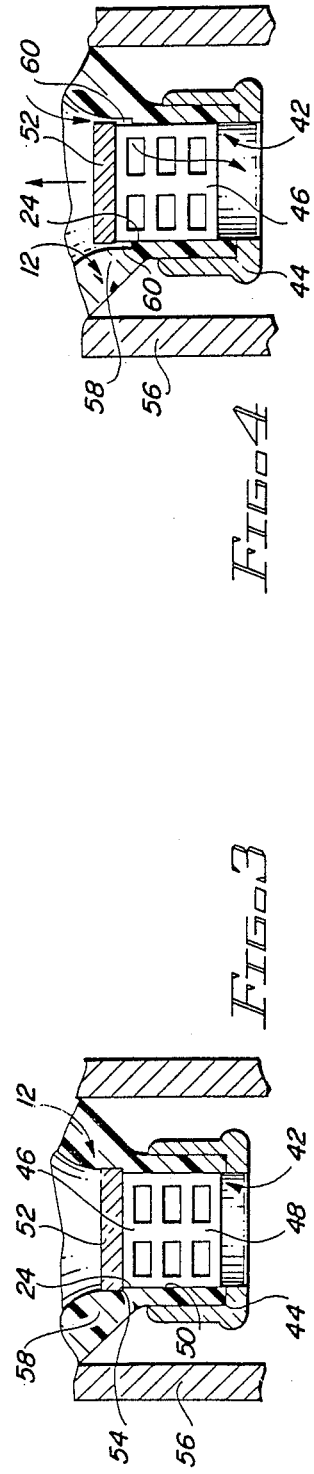

DRAIN PIPE PLUG DEVICE

BACKGROUND OF THE INVENTION

1. Field of the Invention

The present invention generally relates to plumbing devices and, more particularly, to an improved device for temporarily plugging drain pipes in order to test the same.

2. Prior Art

When a new home, condominium or apartment house or the like is constructed, the drains must be tested for leaks before they can be approved by an inspector. This is usually accomplished by first inserting a temporary plug device through the clean-out pipe located outside the structure to a point where it intersects a sewer line running from the structure drain to the main sewer line. Such plug device usually is an elongated hollow expansible sausage-like unit which has a nipple at one end through which air is introduced into the unit until the unit expands sufficiently so that one end blocks the clean-out pipe while the other end of the device seals off the sewer line. Water can then be introduced into the entire house drain and sewer system to check for leaks.

Such a conventional plug device has several drawbacks. Thus, the device is usually difficult to slide into place and to retrieve due to its shape. Moreover, when the device is deflated the fluid from the house drains not only flows into the sewer line but also backs up through the clean-out pipe, especially in multi-story structures, creating a sanitation hazard. Moreover, the device usually is adapted for use only with one diameter of pipes, necessitating various different sizes of the device to use in various plumbing systems. In addition, if the device is subjected to excess pressure during use, it will rupture, with possible serious injury to workmen and the plumbing and sewage system.

Accordingly, there is a need for an improved type of drain pipe plug device which can be inflated with either a liquid or a gas, and is safe to use. Such device should be easy to insert and retrieve, should not rupture even when subjected to excess inflation pressure, and should be adaptable to various drain pipe diameters. Of more importance, the device should prevent, upon its deflation after the drain test is run, back-flow of fluid from the house drains into the clean-out pipe.

An improved form of drain pipe plug device is described and claimed in U.S. Pat. No. 4,660,603 which issued to the inventor of the present application. That device has the above described features locking in other devices. It comprises an expandible tube having a narrow flexible middle portion and larger flexible opposite end portions with an anti-back flow pressure relief valve at the outlet end. In one embodiment, the sidewall thickness of the device is uniform throughout all three portions, while the diameter varies from portion to portion. In another embodiment, each of the three portions has a uniform but separate wall thickness.

It has been found that the device of U.S. Pat. No. 4,660,603 is difficult and expensive to manufacture and does not provide an optimal seal throughout. Accordingly, there remains a need for an improved device which is inexpensive and simple to manufacture and provides optimal drain sealing throughout the device.

SUMMARY OF THE INVENTION

The improved drain pipe plug device of the present invention satisfies all the foregoing needs. The device is substantially as set forth in the Abstract. The device is designed to temporarily expand under pressure and thereby block the clean-out pipe and connecting sewer pipe of a drain pipe system to enable the system to be tested with water.

The device comprises an elongated, flexible, resilient member of rubber or the like having a front outlet portion, a rear inlet portion and a middle portion connecting the front and rear portions. All three portions are of substantially the same external diameter. A central passageway extends the length of the device and terminates in a tapered rear inlet to which a fluid pressure connector is secured, and a tapered front outlet in which an anti-back flow pressure relief valve is disposed.

The sidewall thickness of the device tapers down uniformly from the front portion, through the middle and rear portions of the device. This results in sequential deflation of the tubular member from the outlet portion, through the middle portion and then the inlet portion, after testing the drainage system in which the device is installed, resulting in shunting water out the sewer line in which the outlet portion is disposed while preventing water back up into the clean-out pipe in which the inlet portion is still inflated and acting as a block.

The devices' tapered front and rear portions and ribbed exterior facilitate ease of insertion of the device into drain lines and removal therefrom. Both longitudinal and transverse external ribs may be disposed in all three portions, with the longitudinal ribs slightly lower in height than the transverse ribs in the outlet and inlet portions, to facilitate sliding and sealing drain pipes.

The device is inexpensive, simple, durable, efficient and safe to use. Other advantages of the device are set forth in the following detailed description and accompanying drawings.

DRAWINGS

FIG. 1 is a schematic, fragmentary side elevation, partly broken away and partly in section, of a first preferred embodiment of the improved drain plug device of the present invention, showing the device in the resting unexpanded condition;

FIG. 2 is a schematic fragmentary side elevation, partly broken away and partly in section of a second preferred embodiment of the improved drain plug device of the present invention, showing the device in the unexpanded condition;

FIG. 3 is an enlarged, schematic fragmentary cross-section of the pressure relief valve and front portion of the device of FIG. 1 with the device in the unexpanded condition; and, FIG. 4 is an enlarged, fragmentary schematic cross-section of the front portion of the device of FIG. 1 under sufficient excess pressure to cause the pressure relief valve thereof to operate to allow reduction of the excess pressure and flow of fluid around the valve plate and out of the device.

DETAILED DESCRIPTION FIGS. 1, 3 & 4.

Now referring more particularly to FIGS. 1, 3 and 4 of the drawings, a first preferred embodiment of the improved drain plug device of the invention is schematically depicted therein. Thus, device 10 is shown which comprises an elongated, hollow, tubular, generally cylindrical, resilient, flexible member 12 fabricated of elastomeric material such as natural or synthetic rubber or plastic or the like. Member 12 is capable of expanding radially under internal fluid pressure to block a drain pipe, sewer line or the like.

Member 12 has a rear inlet portion 14 integrally connected to an elongated middle portion 16, in turn integrally connected to a front outlet portion 18 to form a unitary structure. The three portions 14, 16 and 18 have essentially the same external diameter. An internal central fluid passageway 20 is disposed throughout the length of member 12 terminating in a narrow inlet 22 and a narrow outlet 24. It will be noted that portions 14 and 18 have a plurality of spaced, parallel, transverse, integral external reinforcing ribs 26, while portion 16 has a grid pattern comprising a plurality of spaced parallel, external reinforcing ribs 28 running longitudinally and interconnecting spaced, parallel transverse reinforcing ribs 30. Ribs 26, 28 and 30 reduce frictional contact member 12 with the walls of pipes through which they must pass to be placed in a proper blocking location and thereby facilitate sliding of member 12 in pipes.

Device 10 also includes a dual connector 32 secured to inlet 22 and comprising a water hose connector ring 34 in which is releasably screwed a plug 36 bearing a gas hose fitting 38 and removable cap 40. Accordingly, member 12 is adapted to receive a gas such as air under pressure through fitting 38 into passageway 20, or, when plug 36 is removed, a liquid such as water under pressure through ring 34 into passageway 20, all for the purpose of radially expanding portions 14, 16 and 18 to block the clean-out pipe and sewer line leading from a house, in order to test the houses plumbing.

It is necessary that member 12 be able to hold pressure in passageway 20. Therefore, it is fitted in outlet 24 with a pressure relief valve 42 which normally blocks passageway 20 (FIGS. 4 and 5) and an external fitting 44 which restricts the expansion of outlet 24. Thus, valve 42 comprises an open tubular cage 46 having spaced interconnected transverse ribs 48 and longitudinal ribs 50 and an imperforate transverse blocking plate 52. Cage 46 can be formed of metal, ceramic, hardened rubber, plastic or the like. Plate 52 is normally located adjacent the rear end of cage 46 in a transverse groove 54 in the narrow outlet 24 of portion 18 to completely block passage of pressurized fluid out of outlet 24, even when portion 18 is radially expanded sufficiently to block pipe 56.

However, when member 12 is over pressurized (FIG. 4), the part 58 of portion 18 defining groove 52 is forced radially outwardly from the outer periphery of plate 52 sufficiently to open a fluid by-pass space 60 therebetween through which excess pressurized fluid by-passes plate 52 and passes through cage 46 and out of member 12 until part 58 is allowed to collapse or flex back against plate 52 to close space 60. Cage 46 during the by-passing may move back slightly as shown in FIG. 4, or remain stationary, depending on the particular configuration of part 58. Thus, valve 42 functions to protect member 12 against over pressurization and blow-out, so as to prevent injury to piping, surrounding building components and personnel.

Device 10 may further include a pair of ears 62 disposed within the outer diameter of member 12 and receiving a transverse ring 64 (FIG. 1) in portion 14 to which may be connected one end of a chain 66, the other end of which may be connected to a pull ring (not shown) to prevent loss of member 12 down a sewer line while member 12 is in the uninflated state and to enable member 12 to be easily drawn from such line.

It will be noted that member 12, although flexible and resilient, is also self-supporting, even in the uninflated state. Thus, it can be easily slid down a clean-out pipe and around the angled junction of such pipe with a sewer line joined to and running from a house drain under a house foundation and out to a sewer main below ground. Member 12 is first passed into the desired blocking position with portion 18 in the sewer line and portion 14 in the clean-out pipe, while member 12 is in the unexpanded state. Portion 16 easily flexes around the angled junction of the clean-out pipe and sewer line. When member 12 is connected through fitting 38 to a pressurized gas line (not shown), gas can be introduced therethrough to inflate member 12 so that all three portions 14, 16, and 18 expand radially sufficiently to cause portion 14 to block the clean-out pipe portion 18 to block the sewer line.

This allows the previously described test then to be run by introducing water into the home sewer and checking for leaks.

It will be noted from FIG. 1 that the thickness of the sidewall 68 of portion 18 tapers down toward portion 14 and is greater than that of the sidewall 70 of portion 16, which is in turn greater than that of the sidewall 72 of portion 14. Thus, there is a gradual and continuous tapering down of the thickness of the sidewalls of member 12 form the portion 18 through portion 16 and through portion 14. It will also be noted that the end 74 of portion 18 is tapered externally down toward outlet 24 and its wall thickness in the tapered portion is greater than that of the remainder of portion 18, exclusive of outlet 24. Similarly, the wall thickness of the tapered down end 76 of inlet portion 14 adjacent inlet 22 is also of greater thickness than the remainder of portion 14, exclusive of inlet 22. This is needed to stabilize the shape and functionality of inlet 22 and outlet 24. For example, portion 18, exclusive of end 74 preferably has a maximum wall thickness between ribs 26 of 0.30 inches, which gradually decreases. The minimum wall thickness of portion 14, exclusive of end 76 and between ribs 26 may be about 0.20 inch, with that of portion 16 between the two described figures. The maximum wall thickness of ends 74 and 76 may be, for example, about 0.7–0.8 inch.

Tubular member 12 may be, for example, about 20 inches in length, exclusive of connector 32, with an overall length of about 21 or so inches, portion 16 being about 9 inches long, portion 14 being about 5 inches long, portion 18 being about 6.5 inches long, and with all three portions having an external uniform diameter of about 2.25–2.4 inches, exclusive of tapered ends 74 and 76. Inlet 22 and outlet 24 may have an external diameter, for example, of about 1.165 inch and 1.19 inch respectively.

Ribs 26 may be, for example, about 0.150 inch in uniform thickness in both portions 14 and portion 18. Ribs 28 and 30 of portion 16 may be, for example, about 0.10 inch in thickness. The described gradual tapering in wall thickness from portion 18 through portions 16 and 14 combined with the uniform outer diameter of these three portions increases the ease and speed of manufacture of member 12 and increases the sealing efficiency of device 10, since portion 16 can function as a drain plug seal, as well as portions 14 and 18, while still being able to bend around pipe turns.

Since portion 18 has a greater wall thickness than portion 16, in turn greater than portion 14 when at the end of the test, pressure is relieved to deflate member 12, portion 18 collapses before portion 16 and portion 16 collapses before portion 14. This allows water to instantly pass around portion 18 and out the sewer line while the clean-out pipe remains blocked by portions 16 and 14 or at least portion 14. Thus, water cannot back up clean-out pipe. Water clears the area very rapidly, so that portions 14 and 16 can also deflate fairly rapidly to allow member 12 to be easily pulled out of the clean-out pipe by its ring 64 and chain 66.

It will be understood that device 10 can be of any suitable length and diameter and of any suitable radial expansibility, so long as it is of substantially uniform external diameter and has the desired tapered wall thickness. In one embodiment, member 12 is sized so that portions 14 and 18 can simultaneously block three inch and four inch diameter pipes. Thus, device 10 is simple, efficient and durable. It is inexpensive and easy to install and remove and is adaptable to a variety of situations. Since ends 74 and 76 are tapered down externally, easier passage of member 12 through pipes is afforded for faster, smoother use.

FIG. 2

A second preferred embodiment of the improved drain pipe plug device of the present invention is schematically depicted in FIG. 8. Thus, device 10a is shown. Components of device 10a similar to those of device 10 bear the same numerals, but are succeeded by the letter "a". Device 10a is substantially identical to device 10, except that ribs 28a extend thereabout portions 14a, 16a and 18a of member 12a for better overall strength in member 12, but ribs 28a in portions 14a and 18a have a height about 20/1000 inch below the height of ribs 26a. This enables ribs 26a in portions 14a and 16a to flex during sliding through pipes, allowing easier passage of member 12, and also to provide a better flexible sealing action when in place in such pipes. Connector 32a is identical to connector 32. Valve 42a is identical to valve 42. Device 10a performs substantially similarly to device 10 and has most of the advantages thereof.

Various other modifications, changes, alterations and additions can be made in the improved drain pipe plug device of the present invention, its components and their parameters. All such changes, modifications, alterations and additions as are within the scope of the appended claims form part of the present invention.

What is claimed is:

1. An improved drain pipe plug device, said device comprising, in combination:
   (a) an elongated, elastomeric, hollow, flexible, resilient, generally cylindrical member having interconnected sidewalls and end walls defining a generally central passageway extending throughout the length thereof, with exits at opposite ends thereof through said end walls, said generally cylindrical member having contiguous front outlet portion, rear inlet portion and middle portion, all of substantially the same external diameter and all being radially expansible under air and water pressure to block drain pipes, said sidewalls substantially uniformly tapering down in thickness from said front outlet portion through said middle portion and said rear inlet portion, whereby said front outlet portion deflates more rapidly than said middle portion and said rear inlet portion, for improved performance;
   (b) connector means sealingly connected to said rear inlet portion for introduction of fluid under pressure into said passageway to radially expand said cylindrical member to cause it to plug a drain pipe; and,
   (c) a pressure relief valve in said front outlet portion to prevent rupture of said device under excess pressure.

2. The improved drain pipe plug device of claim 1 wherein the front end of said front outlet portion is tapered down to facilitate passage of said device through sewer and drain pipes.

3. The improved drain pipe plug device of claim 2 wherein said front outlet portion and said rear inlet portion are each provided with a plurality of integral, external, spaced transverse ribs to minimize frictional resistance and reinforce the sidewalls thereof, thereby facilitating passage of said device through drain and sewer pipes.

4. The improved drain pipe plug device of claim 3 wherein said middle portion has an external grid pattern of longitudinal and transverse ribs for reinforcement purposes.

5. The improved drain pipe plug device of claim 4 wherein the rear end of said rear inlet portion is tapered down to facilitate passage of said device through sewer and drain pipes and bears a spaced pair of ears to which a collar and pull chain are releasably secured.

6. The improved drain pipe plug device of claim 1 wherein said connector means comprises at least one of a water line connector and an air hose connector.

7. The improved drain pipe plug device of claim 5 wherein said grid pattern extends through said front and rear portions which each bear external integral spaced longitudinally extending ribs intersecting said transverse ribs.

8. The improved drain pipe plug device of claim 7 wherein said longitudinally extending ribs in said front outlet and rear inlet portions are of a height less than that of said transverse ribs, whereby improved flexing and drain sealing by said transverse ribs in said front outlet and rear inlet portions are effected.

9. The improved drain pipe plug device of claim 8 wherein said tapering down of said wall thickness from said front outlet portion through said middle portion and said rear inlet portion is uniform, wherein said device, exclusive of said ends, is cylindrical and of a single external diameter, and wherein the pattern of said spaced ribs extends throughout the single diameter portion of said device.

10. The improved drain pipe plug device of claim 9 wherein said sidewall tapers down from a thickness of about 0.3 inch to a thickness of about 0.2 inch.

11. The improved drain pipe plug device of claim 10 wherein the height of said longitudinal ribs in said front outlet and rear inlet portions is about 20/1000 inch below the height of said transverse ribs in the same portions.

12. An improved drain plug device comprising
   (a) an elongated, elastomeric, hollow, flexible, resilient, generally cylindrical member having a front outlet portion, a middle portion and a rear inlet portion,
   (b) said cylindrical member having sidewalls which gradually and continuously increase in thickness along the length thereof from said inlet portion to said outlet portion, and (c) connector means sealingly connected to said rear inlet portion for introduction of fluid under pressure to cause expansion of said member, (d) whereby upon the introduction of fluid under pressure into said cylindrical member, the inlet portion expands at a faster rate than said outlet portion.

13. The improved drain pipe plug device of claim 12 wherein the front end of said front outlet portion is tapered down to facilitate passage of said device through sewer and drain pipes.

14. The improved drain pipe plug device of claim 13 wherein said front outlet portion and said rear inlet portion are each provided with a plurality of integral, external, spaced transverse ribs to minimize frictional resistance and reinforce the sidewalls thereof, thereby facilitating passage of said device through drain and sewer pipes.

15. The improved drain pipe plug device of claim 14 wherein said middle portion has an external grid pattern of longitudinal and transverse ribs for reinforcement purposes.

16. The improved drain pipe plug device of claim 15 wherein one end of said rear inlet portion is tapered down to facilitate passage of said device through sewer and drain pipes and to which a pull chain is releasably secured.

17. The improved drain pipe plug device of claim 12 wherein said connector means comprises at least one of a water line connector and an air hose connector.

18. The improved drain pipe plug device of claim 16 wherein said grid pattern extends through said front and rear portions which each bear external integral spaced longitudinally extending ribs intersecting said transverse ribs.

19. The improved drain pipe plug device of claim 17 wherein said longitudinally extending ribs in said front outlet and rear inlet portions are of a height less than that of said transverse ribs, whereby improved flexing and drain sealing by said transverse ribs in said front outlet and rear inlet portions are effected.

20. The improved drain pipe plug device of claim 18 wherein said tapering down of said wall thickness from said front outlet portion through said middle portion and said rear inlet portion is uniform, wherein said device, exclusive of said ends, is cylindrical and of a single external diameter, and wherein the pattern of said spaced ribs extends throughout the single diameter portion of said device.

21. The improved drain pipe plug device of claim 19 wherein said sidewall tapers down from a thickness of about 0.3 inch to a thickness of about 0.2 inch.

22. The improved drain pipe plug device of claim 21 wherein the height of said longitudinal ribs in said front outlet and rear inlet portions is about 20/1000 inch below the height of said transverse ribs in the same portions.

* * * * *